(12) United States Patent
Balasubramanian et al.

(10) Patent No.: US 12,272,357 B2
(45) Date of Patent: Apr. 8, 2025

(54) SYSTEM AND METHOD FOR ACCENT-AGNOSTIC FRAME-LEVEL WAKE WORD DETECTION

(71) Applicant: Samsung Electronics Co., Ltd., Suwon-si (KR)

(72) Inventors: Sivakumar Balasubramanian, Sunnyvale, CA (US); Gowtham Srinivasan, San Jose, CA (US); Srinivasa Rao Ponakala, Sunnyvale, CA (US); Vijendra Raj Apsingekar, San Jose, CA (US); Anil Sunder Yadav, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 17/929,280

(22) Filed: Sep. 1, 2022

(65) Prior Publication Data

US 2023/0368786 A1    Nov. 16, 2023

Related U.S. Application Data

(60) Provisional application No. 63/341,139, filed on May 12, 2022.

(51) Int. Cl.
  *G10L 15/22* (2006.01)
  *G10L 15/06* (2013.01)
(52) U.S. Cl.
  CPC ......... *G10L 15/22* (2013.01); *G10L 15/063* (2013.01); *G10L 2015/0631* (2013.01); *G10L 2015/223* (2013.01)

(58) Field of Classification Search
  None
  See application file for complete search history.

(56) References Cited

U.S. PATENT DOCUMENTS

| 5,638,487 A | 6/1997 | Chigier |
| 9,311,915 B2 | 4/2016 | Weinstein et al. |
| (Continued) | | |

FOREIGN PATENT DOCUMENTS

| CN | 105632501 A | 6/2016 |
| CN | 109036412 A | 12/2018 |
| CN | 111081217 A | 4/2020 |

OTHER PUBLICATIONS

International Search Report and Written Opinion of the International Searching Authority dated Jul. 4, 2023, in connection with International Application No. PCT/KR2023/004175, 8 pages.

(Continued)

*Primary Examiner* — Quynh H Nguyen

(57) ABSTRACT

A method includes accessing, using at least one processor of an electronic device, a machine learning model. The machine learning model is a trained student model that is trained using audio samples in a plurality of accent types. The method also includes receiving, using the at least one processor, an audio input from an audio input device. The method further includes providing, using the at least one processor, the audio input to the trained student model. The method also includes receiving, using the at least one processor, an output from the trained student model including frame-level probabilities associated with the audio input. In addition, the method includes instructing, using the at least one processor, at least one action based on the frame-level probabilities associated with the audio input.

24 Claims, 12 Drawing Sheets

(56) References Cited

U.S. PATENT DOCUMENTS

| | | |
|---|---|---|
| 2016/0078339 A1 | 3/2016 | Li et al. |
| 2019/0051290 A1 | 2/2019 | Li et al. |
| 2021/0020162 A1 | 1/2021 | Griffin et al. |
| 2021/0183392 A1 | 6/2021 | Lee et al. |
| 2022/0198181 A1* | 6/2022 | Huang .................... G06N 3/08 |

OTHER PUBLICATIONS

Supplementary European Search Report dated Dec. 23, 2024, in connection with European Patent Application No. 23803693.3, 7 pages.

Ghorbani et al.: "Advancing Multi-Accented Lstm-CTC Speech Recognition Using a Domain Specific Student-Teacher Learning Paradigm", 2018 IEEE Spoken Language Technology Workshop (SLT), Dec. 2018, 7 pages.

Dighe et al.: "Knowledge Transfer for Efficient on-Device False Trigger Mitigation", 2021 IEEE International Conference on Acoustics, Speech and Signal Processing (ICASSP), Jun. 2021, 5 pages.

* cited by examiner

SYSTEM AND METHOD FOR ACCENT-AGNOSTIC FRAME-LEVEL WAKE WORD DETECTION

CROSS-REFERENCE TO RELATED APPLICATION AND PRIORITY CLAIM

This application claims priority under 35 U.S.C. § 119(e) to U.S. Provisional Patent Application No. 63/341,139 filed on May 12, 2022, which is hereby incorporated by reference in its entirety.

TECHNICAL FIELD

This disclosure relates generally to machine learning systems. More specifically, this disclosure relates to a system and method for accent-agnostic frame-level wake word detection.

BACKGROUND

An automated speech recognition (ASR) model is often configured to listen for a user to begin speaking and to recognize a word or phrase in a captured user utterance that alerts the automated speech recognition model to a user intent to use the automated speech recognition model. Such trigger words are dubbed "wake words." Once the automated speech recognition model determines that a user utterance includes a wake word, the automated speech recognition model processes the same user utterance or one or more additional user utterances to fulfill at least one user request. However, to account for user utterances that are in different languages or accent types, automated speech recognition models often include multiple wake word detection models, each of which is trained for wake word detection in a particular language or accent. This results in increased complexity in both training and inferencing of the automated speech recognition model and requires more storage to store the models trained on different accents or languages.

SUMMARY

This disclosure relates to a system and method for accent-agnostic frame-level wake word detection.

In a first embodiment, a method includes accessing, using at least one processor of an electronic device, a machine learning model. The machine learning model is a trained student model that is trained using audio samples in a plurality of accent types. The method also includes receiving, using the at least one processor, an audio input from an audio input device. The method further includes providing, using the at least one processor, the audio input to the trained student model. The method also includes receiving, using the at least one processor, an output from the trained student model including frame-level probabilities associated with the audio input. In addition, the method includes instructing, using the at least one processor, at least one action based on the frame-level probabilities associated with the audio input.

In a second embodiment, an apparatus includes at least one processing device configured to access a machine learning model. The machine learning model is a trained student model that is trained using audio samples in a plurality of accent types. The at least one processing device is also configured to receive an audio input from an audio input device and to provide the audio input to the trained student model. The at least one processing device is further configured to receive an output from the trained student model including frame-level probabilities associated with the audio input. In addition, the at least one processing device is configured to instruct at least one action based on the frame-level probabilities associated with the audio input.

In a third embodiment, a non-transitory computer readable medium contains instructions that when executed cause at least one processor to access a machine learning model. The machine learning model is a trained student model that is trained using audio samples in a plurality of accent types. The medium also contains instructions that when executed cause the at least one processor to receive an audio input from an audio input device and to provide the audio input to the trained student model. The medium further contains instructions that when executed cause the at least one processor to receive, an output from the trained student model including frame-level probabilities associated with the audio input. In addition, the medium contains instructions that when executed cause the at least one processor to instruct at least one action based on the frame-level probabilities associated with the audio input.

In a fourth embodiment, a method includes training, using at least one processor of an electronic device, a student keyword detector model using information distilled from a plurality of trained teacher keyword detector models. Training the student keyword detector model includes accessing a positive training dataset including audio samples that include an utterance of a wake word in a plurality of accent types. Training the student keyword detector model also includes providing at least a portion of the audio samples in the positive training dataset as inputs to the plurality of trained teacher keyword detector models, where each of the plurality of trained teacher keyword detector models is associated with one of the plurality of accent types. Training the student keyword detector model further includes receiving, from the plurality of trained teacher keyword detector models, frame-level probabilities associated with one or more frames in each of the audio samples. In addition, training the student keyword detector model includes training the student keyword detector model to detect the wake word using the frame-level probabilities received from each of the plurality of trained teacher keyword detector models.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
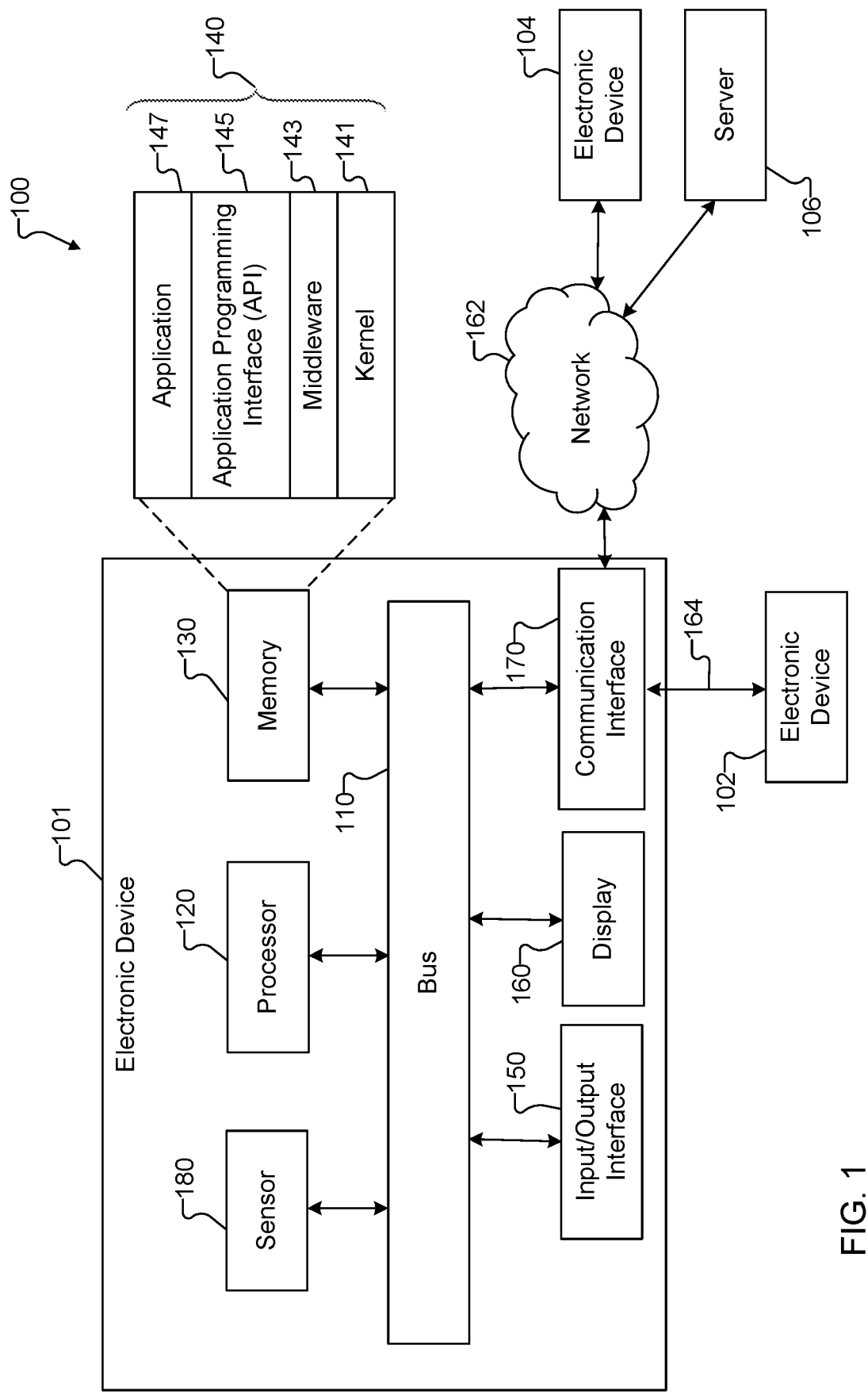
FIG. 1 illustrates an example network configuration including an electronic device in accordance with embodiments of this disclosure.

FIGS. 1 through 10B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, an automated speech recognition (ASR) model is often configured to listen for a user to begin speaking and to recognize a word or phrase in a captured user utterance that alerts the automated speech recognition model to a user intent to use the automated speech recognition model. Such trigger words are dubbed "wake words." Once the automated speech recognition model determines that a user utterance includes a wake word, the automated speech recognition model processes the same user utterance or one or more additional user utterances to fulfill at least one user request. However, to account for user utterances that are in different languages or accent types, automated speech recognition models often include multiple wake word detection models, each of which is trained for wake word detection in a particular language or accent. This results in increased complexity in both training and inferencing of the automated speech recognition model and requires more storage to store the models trained on different accents or languages. Moreover, models that are specific to a particular language deployed in regions where there are a multitude of accents in the particular language due to diverse demographics, such as English models deployed in the United States, often require data from all accents in the regions in order to successfully detect wake words. Some prior models for regions with diverse accent types are trained on a mixture of datasets from different accents, but such training proves difficult for keyword detector models of the desired small storage size to learn the different accents.

This disclosure provides for training and using a keyword detector model that is accent-agnostic. Various embodiments of this disclosure provide for training a lightweight keyword detector model by distilling information from teacher models trained on particular accent types, resulting in a single keyword detector model that is trained to recognize utterances of a plurality of accent types. In some embodiments, the single keyword detector model can be merely kilobytes in size, reducing the storage requirements compared to prior systems that required multiple keyword detector models to accommodate various accents. The improved keyword detector model of the various embodiments of this disclosure has been found to provide accuracy rates comparable to or better than prior models trained on one accent and better accuracy rates than models (such as United States English models) that are trained on multiple accents without using the training processes using knowledge distillation described in the various embodiments of this disclosure.

FIG. 1 illustrates an example network configuration 100 including an electronic device in accordance with embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 may receive and process inputs (such as audio inputs or data received from an audio input device like a microphone) and perform keyword detection and automated speech recognition tasks using the input. The processor 120 may also instruct other devices to perform certain operations (such as outputting audio using an audio output device like a speaker) or display content on one or more displays 160. The processor 120 may further receive inputs (such as data samples to be used in training machine learning models) and can manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of audio data, recognizing words in utterances included in the audio data, performing speech recognition on the utterances, and executing tasks related to the content of the utterances. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 may receive and process inputs (such as audio inputs or data received from an audio input device like a microphone) and perform keyword detection and automated speech recognition tasks using the input. The server 106 may also instruct other devices to perform certain operations (such as outputting audio using an audio output device like a speaker) or display content on one or more displays 160. The server 106 may further receive inputs (such as data samples to be used in training machine learning models) and can manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
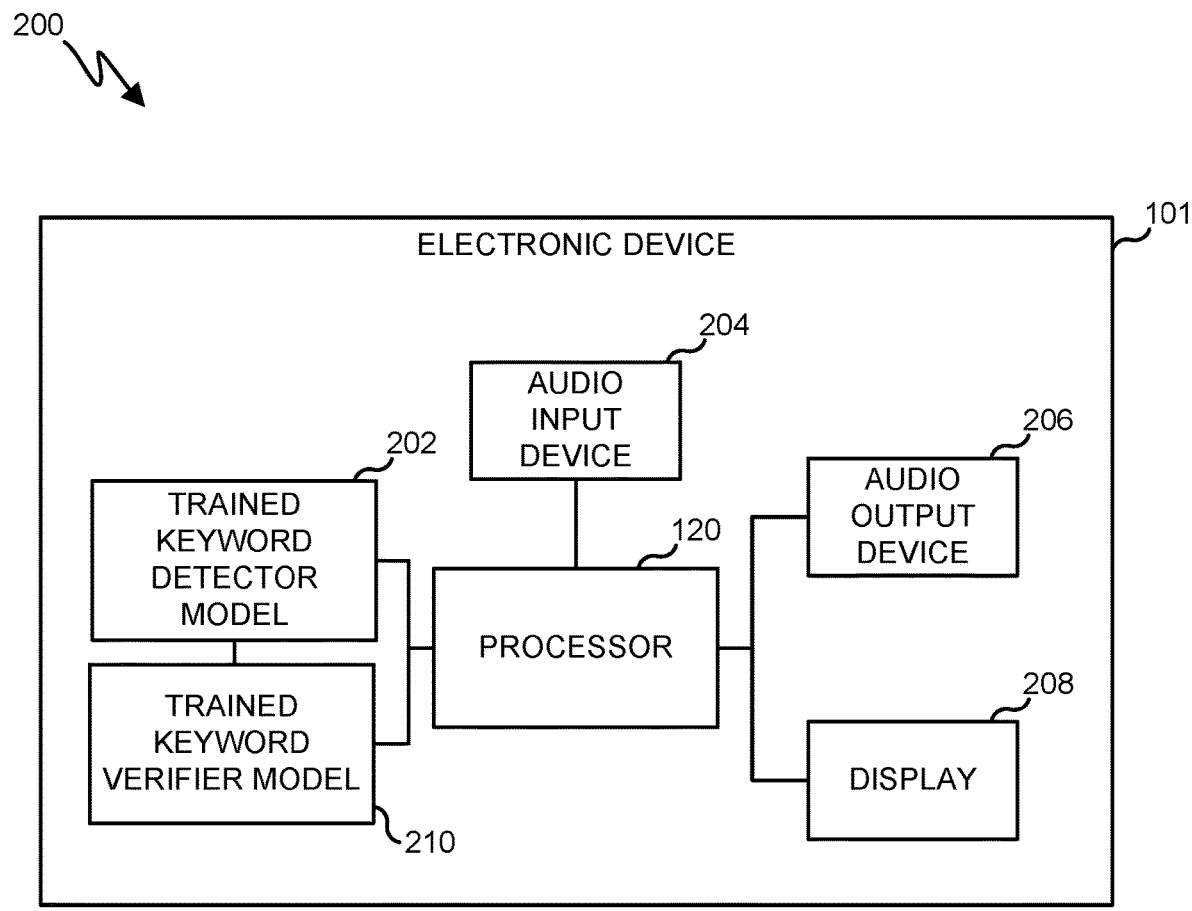
FIG. 2 illustrates an example keyword detection system in accordance with embodiments of this disclosure.

FIG. 2 illustrates an example keyword detection system 200 in accordance with embodiments of this disclosure. For ease of explanation, the system 200 is described as involving the use of the electronic device 101 of FIG. 1. However, the system 200 may be used with any other suitable electronic device.

As shown in FIG. 2, the system 200 includes the electronic device 101, which includes the processor 120. The processor 120 is operatively coupled to one or more machine learning models, including a keyword detector model 202 trained (as a student model according to various embodiments of this disclosure) to recognize a plurality of accent types. It will be understood that the machine learning models can be stored in a memory of the electronic device 101, such as the memory 130, and accessed by the processor 120 to perform automated speech recognition tasks and other tasks. However, the machine learning models can be stored in any other suitable manner.

The system 200 also includes an audio input device 204 (such as a microphone), an audio output device 206 (such as a speaker or headphones), and a display 208 (such as a screen or a monitor like the display 160). The processor 120 receives an audio input from the audio input device 204 and provides the audio input to the trained keyword detector model 202. The trained keyword detector model 202 detects whether a wake word is included in an utterance within the audio data and outputs a result to the processor 120, such as one or more probabilities that the utterance includes the wake word. For example, in various embodiments of this disclosure, the keyword detector model 202 is a frame-level detector model that outputs frame-level probabilities for different frames of audio data within an utterance. If the output indicates the utterance includes a wake word, such as if one or more probabilities are above a threshold, the processor 120 can instruct at least one action of the electronic device 101 or of another electronic device.

In some embodiments, the trained keyword detector model 202 is trained to detect a wake word (such as "BIXBY") or a phrase (such as "hey BIXBY") included in an utterance and spoken in a plurality of accents. In response to a positive detection of the wake word or phrase, the processor 120 instructs one or more further actions that correspond to one or more instructions or requests provided in the utterance. The trained keyword detector model 202 recognizes various accent types with high accuracy, allowing for the accurate processing of utterances in a plurality of languages and accents. The use of a single trained keyword detector model 202, in conjunction with a low footprint (such as in kilobytes) of the single trained keyword detector model 202, allows for fast inferencing times in response to utterances so that a user is not waiting for a response and conversational operations between the user and the electronic device 101 are more natural and efficient.

As a particular example, assume an utterance is received from a user via the audio input device 204 including a wake word or phrase (such as "hey BIXBY, call mom") in a United States English accent. Here, the trained keyword detector model 202 detects the presence of the wake word "BIXBY" or phrase "hey, BIXBY," and the processor 120 instructs the audio output device 206 to output "calling Mom." The processor 120 also causes a phone application or other communication application to begin a communication session with a "mom" contact stored on the electronic device 101 or otherwise in association with the user of the electronic device 101. The same trained keyword detector model 202 can also detect the wake word or phrase in the same utterances or in different utterances for a plurality of other accents. For example, suppose an utterance of "hey BIXBY, start a timer" is received in a different accent, such as a British English accent or an Indian English accent, or another language and accent such as regional Korean or Chinese language and accent. The trained keyword detector model 202 would still detect the presence of the wake word "BIXBY" or phrase "hey, BIXBY," and the processor 120 may instruct execution of a timer application and display of a timer on the display 208 of the electronic device 101.

In some embodiments, the keyword detection performed by the electronic device 101 can be a two-stage process using the trained keyword detector model 202 and a trained keyword verifier model 210. For example, the trained keyword detector model 202 may continuously listen for audio inputs for audio detected by the audio input device 204, receive an utterance, and output frame-level probabilities for the utterance that act as frame-level labels indicating whether a trigger word is present in a frame. The keyword verifier model 210 may take an entire audio input (such as an audio of about 1.2 seconds) and the frame-level probabilities output by the trained keyword detector model 202 and generate a single prediction (that is, a word-level probability) of whether the audio contains the wake word or phrase. In this way, the keyword verifier model 210 can verify the wake word or phrase was detected, adding further confidence in the wake word detection. Based on the probabilities from the trained keyword detector model 202 and the trained keyword verifier model 210, the processor 120 can instruct further action(s) of the electronic device.

In various embodiments, it will be understood that the trained keyword detector model 202 and the trained keyword verifier model 210 can operate to detect whether the wake word or phrase is in an utterance. Based on that determination, the utterance will or will not be provided to another machine learning model (such as an automated speech recognition model) for further processing of the remaining instruction portion of the utterance, such as the "start a timer" portion. In various embodiments, the trained keyword detector model 202 acts as a gatekeeper to provide a lightweight solution for detecting if a wake word is even present in an utterance before committing additional resources to processing the utterance by the electronic device 101.

Although FIG. 2 illustrates one example of a keyword detection system 200, various changes may be made to FIG. 2. For example, the audio input device 204, the audio output device 206, and the display 208 can be connected to the processor 120 within the electronic device 101 via wired connections or circuitry. In other embodiments, the audio input device 204, the audio output device 206, and the display 208 can be external to the electronic device 101 and connected via wired or wireless connections. In some cases, the trained keyword detector model 202 and the trained keyword verifier model 210, as well as other machine learning models, can be stored as separate models called upon by the processor 120 to perform certain tasks or can be included in and form a part of one or more larger machine learning models. Also, in some embodiments, one or more of the machine learning models, including the trained keyword detector model 202 and the trained keyword verifier model 210, can be stored remotely from the electronic device 101, such as on a server 106. Here, the electronic device 101 can transit requests including inputs such as captured audio data to the server 106 for processing of the audio data using the machine learning models, and the results can be sent back to the electronic device 101. In addition, in some embodiments, the electronic device 101 can be replaced by the server 106, which receives audio inputs from a client device and transmits instructions back to the client device to execute functions associated with instructions included in utterances.

Figure 3:
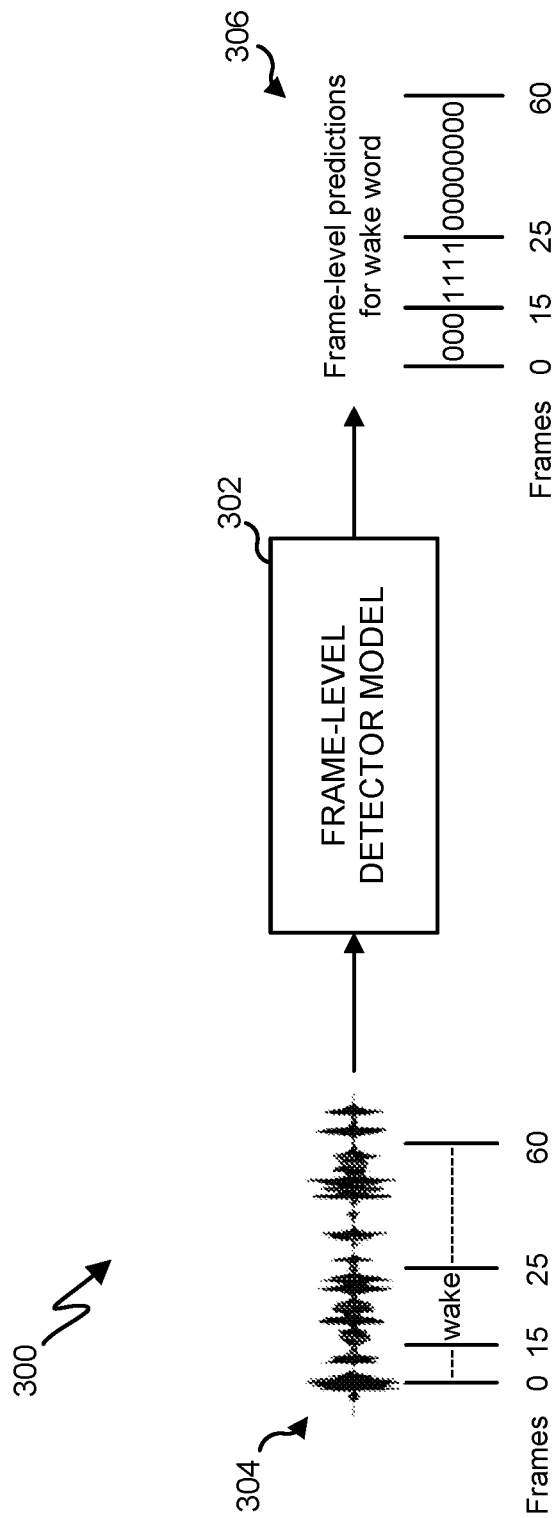
FIG. 3 illustrates an example frame-level detector model process in accordance with embodiments of this disclosure.

FIG. 3 illustrates an example frame-level detector model process 300 in accordance with embodiments of this disclosure. For ease of explanation, the process 300 is described as involving the use of the electronic device 101 of FIG. 1. However, the process 300 may be used with any other suitable electronic device.

As shown in FIG. 3, the process 300 includes a frame-level detector model 302, which can be the trained keyword detector model 202 of FIG. 2. The frame-level detector model 302 is a low weight, low latency model. As shown in FIG. 3, the process 300 includes the frame-level detector model 302 receiving small windows of audio data 304 as inputs and predicting the occurrences of parts of the trigger word or wake word in that window or frame. In various embodiments, the detection happens continuously but, with the small size of the model, power consumption remains low.

As shown in FIG. 3, the frame-level detector model 302 outputs frame-level predictions 306 for the wake word, with "1" for trigger word frames and "0" for other speech and non-speech audio that are not the trigger word. For example, as shown in FIG. 3, where the wake word is the word "wake," the frame-level detector model 302 detects that a frame includes the wake word and labels the frame that includes the wake word with ones. The other frames that do not include the wake word are labeled with zeroes.

Although FIG. 3 illustrates one example of a frame-level detector model process 300, various changes may be made to FIG. 3. For example, although one example of a wake word and one example of a position of the wake word in the sequence of frames processed by the frame-level detector model are shown, it will be understood that other wake words or phrases can be used, and the wake word or phrase could be detected at any position(s) in time based on a continuous processing of audio data frames. Also, in some embodiments, the frame-level probabilities could include numbers between zero and one.

Figure 4:
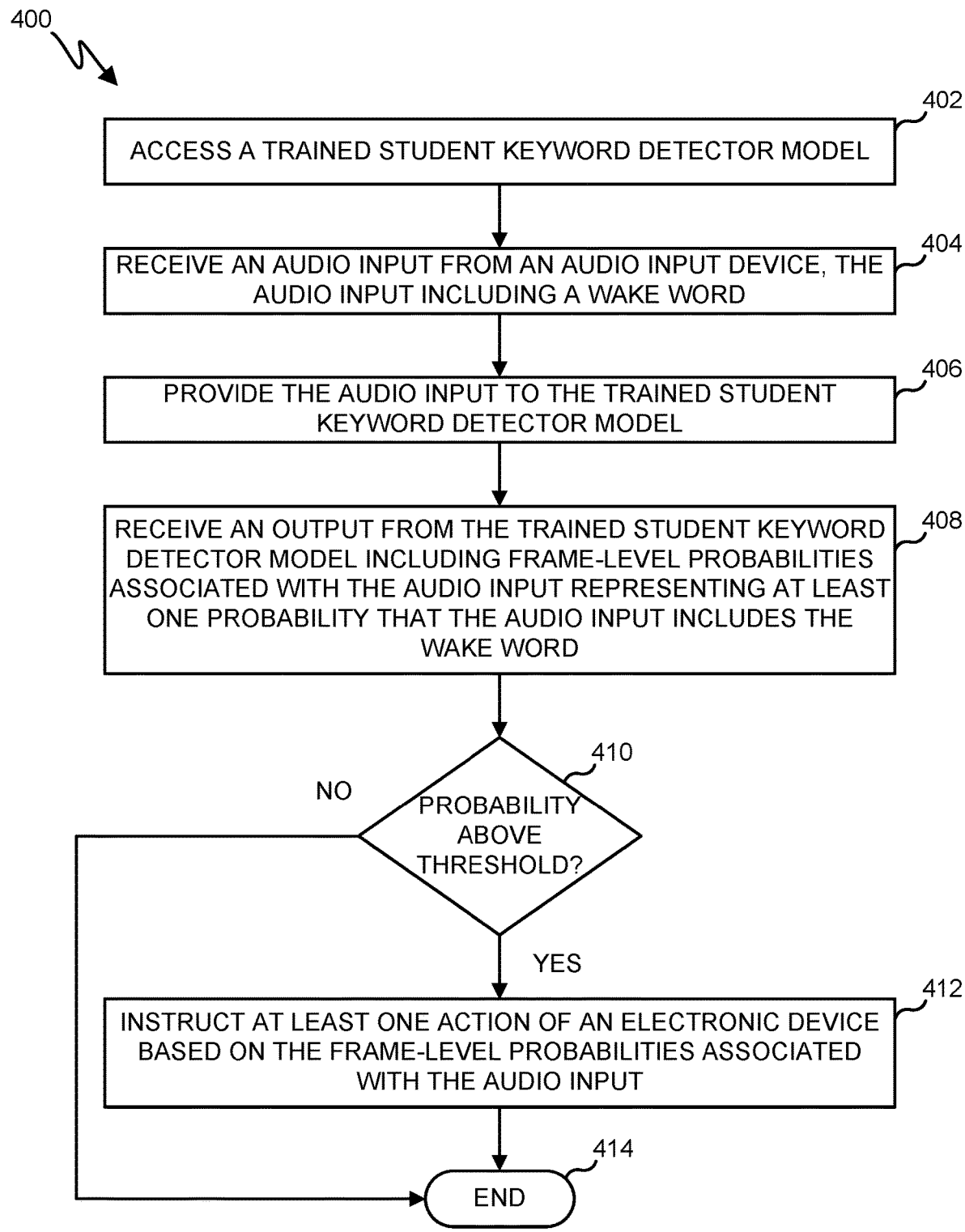
FIG. 4 illustrates an example method for performing keyword detection in accordance with embodiments this disclosure.

FIG. 4 illustrates an example method 400 for performing keyword detection in accordance with embodiments this disclosure. For ease of explanation, the method 400 shown in FIG. 4 is described as being performed using the processor 120 of the electronic device 101 in the network configuration 100 of FIG. 1. However, the method 400 shown in FIG. 4 could be performed using any other suitable device and in any other suitable system.

At block 402, the processor accesses a trained student keyword detector model, such as the trained keyword detector model 202 or the frame-level detector model 302. As described in various embodiments of this disclosure, the trained student keyword detector model is trained by using information distilled from a plurality of trained teacher keyword detector models. Each trained teacher keyword detector model can be trained to process utterances of a different accent type of a plurality of accent types. As described in this disclosure, during training, the information distilled from the plurality of trained teacher keyword detector models includes frame-level probabilities that are output from the plurality of trained teacher keyword detector models and used as labels for at least a portion of the audio samples. These labeled frame-level probabilities from the trained teacher keyword detector models are used to train the student keyword detector model using a loss function. In some embodiments, negative training data that can be labeled with zeroes can also be used during training. The training here results in a single unified trained keyword detector model that accurately recognizes wake words in utterances of the plurality of accent types.

At block 404, the processor receives an audio input from an audio input device, such as a microphone. The audio input in this example may include an utterance that contains a wake word spoken by a user in a particular accent. At block 406, the processor provides the utterance to the trained student keyword detector model. At block 408, the processor receives an output from the trained student keyword detector model, including frame-level probabilities associated with the audio input representing at least one probability that the audio input includes the wake word, such as is described above with respect to FIG. 3.

Based on the frame-level probabilities output by the trained student keyword detector model, the processor may instruct at least one action of an electronic device. For example, at block 410, the frame-level probabilities may indicate that the utterance includes the wake word, such as when one or more of the frame-level probabilities are above a specified threshold. If so, at decision block 412, the processor can instruct the electronic device to perform an action associated with the utterance received via the audio input device. Example actions may include making a phone call, executing a web search function, sending a text message, starting a timer, and so on. To execute the at least one action, the processor can execute further processing of the utterance. For example, the processor can use a word verifier model, such as the keyword verifier model 210, to further verify the utterance includes the wake word and/or can provide the audio input and frame-level probabilities to an automatic speech recognition model that determines one or more intents of the utterance (which can be used by the processor to determine the appropriate task of the electronic device associated with the utterance). If, at decision block 410, the processor determines the probability is not above the threshold, the method 400 ends at block 414.

Although FIG. 4 illustrates one example of a method 400 for performing keyword detection, various changes may be made to FIG. 4. For example, while shown as a series of steps, various steps in FIG. 4 could overlap, occur in parallel, occur in a different order, or occur any number of times. Also, it will be understood that the method 400 can occur repeatedly or continuously, such that the trained student keyword detector model is constantly listening for utterances captured by the audio input device and determining whether the captured audio includes a wake word.

Figure 5:
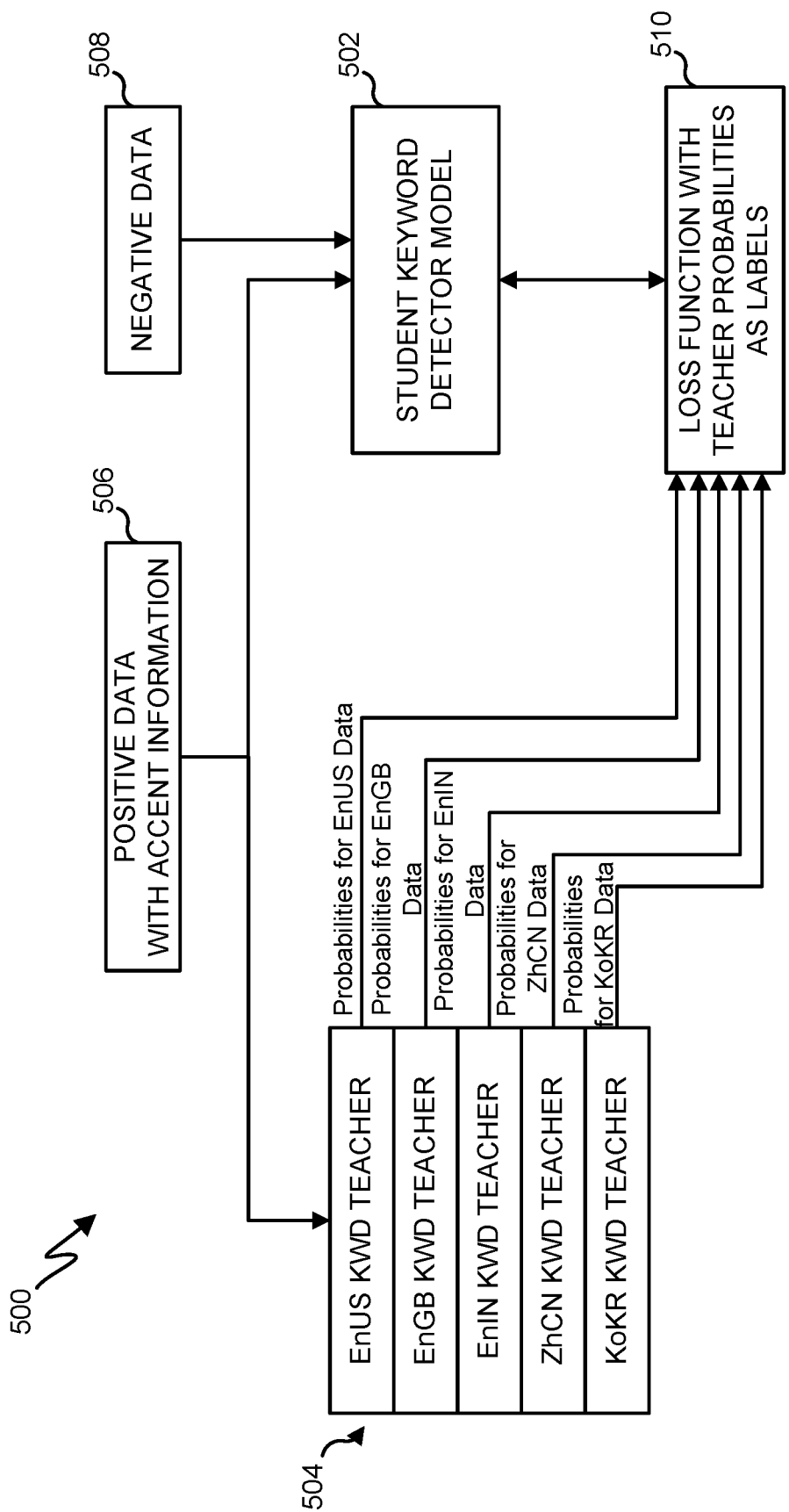
FIG. 5 illustrates an example training architecture using positive training data that includes accent information in accordance with embodiments of this disclosure.

FIG. 5 illustrates an example training architecture 500 using positive training data that includes accent information in accordance with embodiments of this disclosure. For ease of explanation, the architecture 500 is described as involving the use of the server 106 of FIG. 1. For example, the training architecture 500 can be executed on the server 106 of FIG. 1. After training, a trained student keyword detector model can be deployed to a client electronic device 101. However, the architecture 500 may be used with any other suitable device(s), such as the electronic device 101.

As shown in FIG. 5, the training architecture 500 includes a single unified student keyword detector model 502 that is trained with training data for a plurality of accent types using knowledge distillation techniques. To accomplish the knowledge distillation, the architecture 500 includes a plurality of teacher models 504, where each teacher model is already trained to detect one or more trigger words spoken in a particular language and/or accent. In embodiments of this disclosure, a loss function for training the teacher models 504 represents a categorical cross-entropy (CCE) loss between ground truth predictions of frame-level outputs and the predictions of the model. One example of this is shown in Equation (1) below.

$$\text{Teacher\_loss} = CCE(GT, Y) \qquad (1)$$

Here, GT represents the ground truth predictions of the frame-level outputs, and Y represents the predictions of the model.

This ensemble of trained teacher models 504 is used to provide additional knowledge and labels for the student model 502. In some embodiments, the teacher models 504 can be more complex versions of the student model 502 or can be of different architecture(s) that provide(s) the same outputs (frame-level probabilities) as the student model 502. Distilling knowledge from the teacher models 504 that are each already trained on a particular accent provides that a single student keyword detector model 502 can be trained and deployed, rather than having to train and deploy multiple keyword detector models that each corresponds to a different accent. Once trained, the single student keyword detector model 502 can detect the trigger word for a plurality of different accents, increasing the efficiency and reducing the storage footprint of the student keyword detector model 502.

Depending on the implementation, the knowledge distillation-based student training can be performed in multiple ways. First, as shown in FIG. 5, positive data 506 with accent information can be used as at least part of a training dataset, and the frame-level probabilities obtained from each of the plurality of teacher models 504 of particular accent data can be used as labels on the data to train the student keyword detector model 502. As will be described in the examples of FIGS. 6 and 7, for positive data without accent information, the frame-level probabilities can be obtained from the teacher models, word-level probabilities can be obtained from additional keyword verifier models or additional acoustic models for each accent, and the word-level probabilities can be used to weight the frame-level probabilities (with the weighted probabilities being used as labels for the positive data during training of the keyword detector model). Additionally, a gating network may be used for weighting the labels from the teacher models 504 for data without accent information. In various embodiments, each of the different training architectures and processes can use negative data for training the student model, where the student model takes "0" labels for negative data. It will be understood that positive data includes audio samples having an utterance of a wake word or phrase, while negative data includes audio samples of utterances that do not include the wake word or phrase.

As shown in FIG. 5, training using the architecture 500 includes providing the positive data 506 with accent information to the plurality of teacher models 504, where each positive data sample is provided to the teacher model 504 that matches the accent label associated with the positive data sample. Teacher model frame-level probabilities are obtained from the associated teacher accent model 504. For example, if a positive data sample includes an utterance in a British English (enGB) accent, the probabilities of the teacher model 504 trained with only enGB data may be used. Multiple languages and/or accents can be used in this way for training, such as United States English (EnUS), Korean (KoKR), Chinese (ZhCN), and Indian English (EnIN)

accents. The frame-level probabilities obtained from the teacher models 504 are used as labels for the positive data 506 when training the student keyword detector model 502 using a loss function 510.

In various embodiments of this disclosure, to train the student keyword detector model 502, both positive data 506 and negative data 508 are provided to the student keyword detector model 502. The negative data 508 can be provided with "0" labels, and the frame-level probabilities from the teacher models 504 can be used as labels for the positive data 506. Also, in various embodiments of this disclosure, the loss function 510 for training the student keyword detector model 502 is a categorical cross-entropy (CCE) loss between the teacher model predictions of a particular accent data (Y_t_accent) and the predictions for the accent samples from the student (Y_s). One example of this is shown in Equation (2) below.

$$KD\_loss = CCE(Y\_t\_accent, Y\_s) \quad (2)$$

In some embodiments, the keyword detector model loss function 510 can additionally include the standard CCE loss of the ground truth (α). One example of this is shown in Equation (3) below.

$$KD\_loss = \alpha * CCE(Y\_t\_accent, Y\_s) + (1-\alpha) * CCE(GT, Y\_s), 0 \le \alpha \le 1 \quad (3)$$

The training of the student keyword detector model 502 using the loss function 510 results in altering the weights of the student keyword detector model 502 based on the determined loss over a plurality of training batches and/or one or more epochs. This can occur until the loss of the student keyword detector model 502 is minimized, such as below a specified threshold. Once training is complete, the student keyword detector model 502 can be deployed onto a client electronic device as a single lightweight model and used to detect wake words or phrases in a plurality of different accents or languages.

Although FIG. 5 illustrates one example of a training architecture 500, various changes may be made to FIG. 5. For example, although FIG. 5 shows providing frame-level probabilities related to five particular accents and/or languages from the plurality of teacher models 504, the accents and/or languages shown in FIG. 5 are merely examples, and other or additional accent and/or language types (as well as any number of teacher models 504) may be used.

Figure 6:
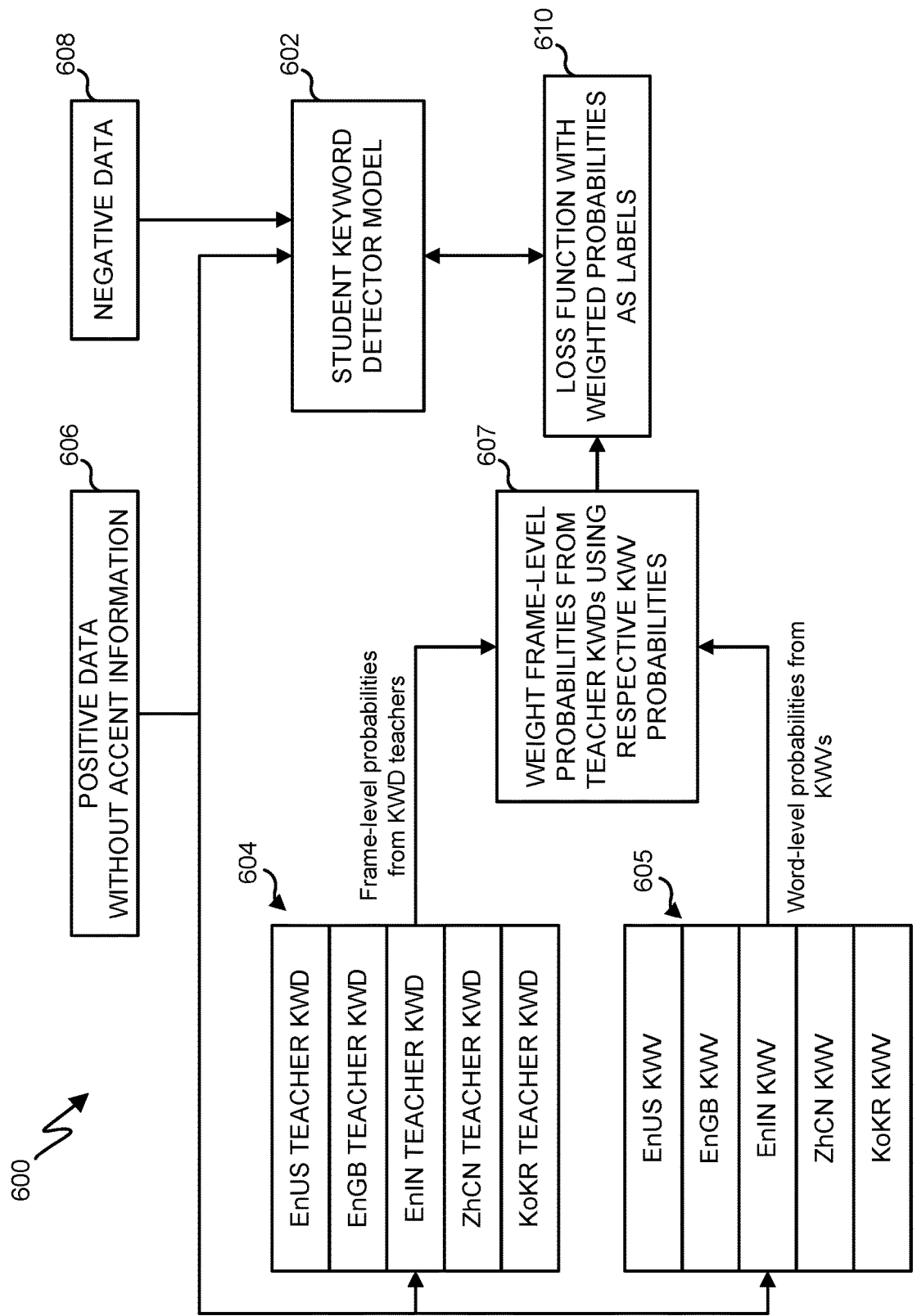
FIG. 6 illustrates an example training with word verifier models architecture using positive training data that does not include accent information in accordance with embodiments of this disclosure.

FIG. 6 illustrates an example training with word verifier models architecture 600 using positive training data that does not include accent information in accordance with embodiments of this disclosure. For ease of explanation, the architecture 600 is described as involving the use of the server 106 of FIG. 1. For example, the training architecture 600 can be executed on the server 106 of FIG. 1. After training, a trained student keyword detector model can be deployed to a client electronic device 101. However, the architecture 600 may be used with any other suitable device(s), such as the electronic device 101.

As shown in FIG. 6, the architecture 600 includes a student keyword detector model 602 to be trained and a plurality of teacher models 604, each of which is trained on a particular accent type. In various embodiments of this disclosure, the teacher models 604 are trained using the same loss function as shown in Equation (1). In the example architecture 600, positive data 606 (including training data that is unlabeled with respect to accent information) is used to train the student keyword detector model 602. The ensemble of trained teacher models 604 is used to provide additional knowledge to be weighted and used as labels for the student model 602. In some embodiments, the teacher models 604 can be more complex versions of the student model 602 or can be of different architecture(s) that provide(s) the same outputs (frame-level probabilities) as the student model 602.

The architecture 600 further includes a plurality of word-level keyword verifier models 605, each of which is also already trained with respect to one of the accent types. In some cases, this can occur using the same dataset(s) used for training the teacher keyword detector models 604. Training the student keyword detector model 602 involves distilling knowledge from both the teacher models 604 and the keyword verifier models 605 to provide a single student keyword detector model 602 for deployment, rather than having to train and deploy multiple keyword detector models that each corresponds to a different accent. Once trained, the single student keyword detector model 602 can detect the trigger word for a plurality of different accents, increasing the efficiency and reducing the storage footprint of the student keyword detector model 602.

Training using the architecture 600 may include providing data samples, such as audio samples, from positive data 606 that does not include accent information as part of the metadata to each one of the teacher keyword detector models 604. The teacher keyword detector models 604 output frame-level probabilities for the positive data 606 without accent information, where the frame-level probabilities provide an indication as to the likelihood that each audio sample frame includes the wake word or phrase. The same sample data from the positive data 606 can be provided to each keyword verifier model 605, which outputs word-level probabilities for the data samples. For example, the keyword verifier models 605 may each take an entire audio input sample and output a single prediction, namely a word-level probability of whether the audio contains the wake word or phrase. For each training sample from the positive data 606, a weighting process 607 executed by the processor weights the frame-level probabilities obtained from the respective teacher keyword detector model 604 using the word-level probabilities obtained from the respective keyword verifier model 605. As a particular example, the frame-level probabilities output by the United States English (EnUS) teacher keyword detector model 604 can be weighted using the word-level probability provided by the United States English (EnUS) keyword verifier model 605. These weighted frame-level probabilities are used as the labels for the positive data 606 when training the student keyword detector model 602.

As shown in FIG. 6, to train the student keyword detector model 602, positive data 606 without accent information and negative data 608 are provided to the student keyword detector model 602. The negative data 608 is provided with "0" labels, and the weighted probabilities from the weighting process 607 are used as labels for the positive data 606. In various embodiments of this disclosure, a loss function 610 for training the student keyword detector model 602 is the CCE loss between predictions of the teacher keyword detector model 604 for a particular sample (Y_t_total) weighted with the audio-level predictions from the keyword verifier model 605 and the predictions for the samples from the student keyword detector model 602 (Y_s). One example of this is shown in Equation (4) below.

$$KD\_loss = CCE(Y\_t\_total, Y\_s) \quad (4)$$

In some embodiments, the keyword detector model loss function 610 can additionally include the standard CCE loss of the ground truth (α). One example of this is shown in Equation (5) below.

$$KD\_loss = \alpha * CCE(Y\_t\_total, Y\_s) + (1-\alpha) * CCE(GT, Y\_s), 0 \leq \alpha \leq 1 \quad (5)$$

The Y_t_total is obtained using the audio-level predictions of each accent keyword verifier model 605 (Y_KWV_accent) for a particular data sample and weighting the frame-level predictions of each output (Y_t_accent) from the teacher keyword detector models 604. All frame outputs of a particular audio from particular accented data are weighted using the same audio-level output for that audio from that particular accented keyword verifier model 605. The weighted frame-level probabilities from all accents are summed, and a softmax function is applied to output a probability distribution and used as labels for training the student keyword detector model 602. One example of this is shown in Equation (6) below.

$$Y\_t\_total = Softmax(Y\_KWV\_enUS * Y\_t\_enUS + Y\_KWV\_enGB * Y\_t\_enGB + \ldots + Y\_KWV\_koKR * Y\_t\_koKR) \quad (6)$$

Here, * denotes a scalar vector multiplication, the KWV probabilities are scalars, and the teacher probabilities per accent are vectors.

The training of the student keyword detector model 602 using the loss function 610 results in altering the weights of the student keyword detector model 602 based on the determined loss over a plurality of training batches and/or one or more epochs. This can occur until the loss of the student keyword detector model 602 is minimized, such as below a specified threshold. Once training is complete, the student keyword detector model 602 can be deployed onto a client electronic device as a single lightweight model and used to detect wake words or phrases in a plurality of different accents.

Although FIG. 6 illustrates one example of a training with word verifier models architecture 600, various changes may be made to FIG. 6. For example, although FIG. 6 shows providing frame-level probabilities related to five particular accents and/or languages from the plurality of teacher models 604 and from the keyword verifier models 605, the accents and/or languages shown in FIG. 6 are merely examples, and other or additional accent and/or language types (as well as any number of teacher models 604 and keyword verifier models 605) may be used. Also, in some embodiments, both the training process of the architecture 500 of FIG. 5 and the training process of the architecture 600 of FIG. 6 can be performed to train the student keyword detector model, such as by providing positive data that includes both a first subset of audio frames labeled with corresponding accent types and a second subset of audio frames not labeled with corresponding accent types. The process of FIG. 5 can be performed using the labeled positive data and the process of FIG. 6 can be performed using the unlabeled positive data to train the student model using both types of positive data.

Figure 7:
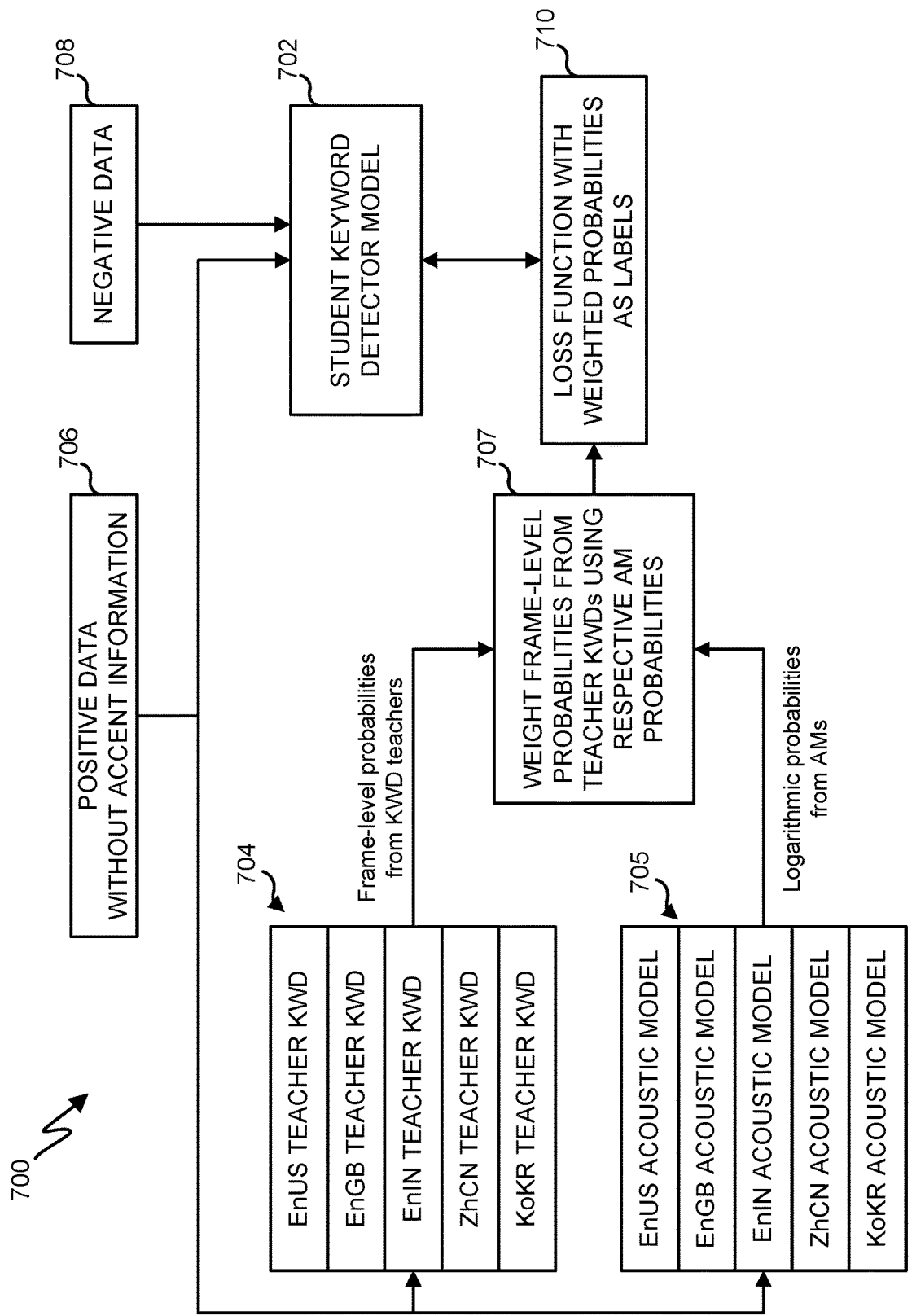
FIG. 7 illustrates an example training with acoustic models architecture using positive training data that does not include accent information in accordance with embodiments of this disclosure.

FIG. 7 illustrates an example training with acoustic models architecture 700 using positive training data that does not include accent information in accordance with embodiments of this disclosure. For ease of explanation, the architecture 700 is described as involving the use of the server 106 of FIG. 1. For example, the training architecture 700 can be executed on the server 106 of FIG. 1. After training, a trained student keyword detector model can be deployed to a client electronic device 101. However, the architecture 700 may be used with any other suitable device(s), such as the electronic device 101.

As shown in FIG. 7, the architecture 700 includes a student keyword detector model 702 to be trained and a plurality of teacher models 704, each of which is trained on a particular accent type. In various embodiments of this disclosure, the teacher models 704 are trained using the same loss function as shown in Equation (1). In the example architecture 700, positive data 706 including training data that is unlabeled with respect to accent information is used to train the student keyword detector model 702. This ensemble of trained teacher models 704 is used to provide additional knowledge to be weighted and used as labels for the student model 702. In some embodiments, the teacher models 704 can be more complex versions of the student model 702 or can be of different architecture(s) that provide(s) the same outputs (frame-level probabilities) as the student model 702.

Here, the architecture 700 provides an alternate weighting mechanism than that described with respect to FIG. 6. In particular, weighting is achieved using acoustic models 705 instead of keyword verifier models. In some embodiments, the acoustic models 705 can be accent-specific automated speech recognition (ASR) models trained to provide sequence probabilities. A connectionist temporal classification (CTC) loss function can be used to obtain logarithmic probabilities of a sequence of speech features, and CTC loss can be used for tasks where the goal is alignment between sequences, such as aligning each character to its location in an audio file. In some cases, the CTC loss represents a loss between a continuous (unsegmented) time series and a target sequence by summing over the probability of possible alignments of input to target, producing a loss value that is differentiable with respect to each input node. Also, in some embodiments, the alignment of input to target can be "many-to-one," which limits the length of the target sequence such that it is the input length.

The CTC loss for the positive data 706 for each accent acoustic model 705 can be calculated and used for weighting the frame-level probabilities obtained from the teacher keyword detector models 704. Training the student keyword detector model 702 may involve distilling knowledge from both the teacher models 704 and the acoustic models 705 to provide a single student keyword detector model 702 for deployment, rather than having to train and deploy multiple keyword detector models that each corresponds to a different accent. Once trained, the single student keyword detector model 702 can detect the trigger word for a plurality of different accents, increasing the efficiency and reducing the storage footprint of the student keyword detector model 702.

Training using the architecture 700 may include providing data samples, such as audio samples, from positive data 706 that does not include accent information as part of the metadata to each one of the teacher keyword detector models 704. The teacher keyword detector models 704 output frame-level probabilities for the positive data 706 without accent information, where the frame-level probabilities provide an indication as to the likelihood that each audio sample frame includes the wake word or phrase. The same sample data from the positive data 706 is provided to each acoustic model 705, which outputs logarithmic probabilities of a sequence of speech features from the data sample. For each training sample from the positive data 706, a weighting process 707 executed by the processor weights the frame-level probabilities obtained from the respective teacher keyword detector model 704 logarithmic probabilities obtained from the respective acoustic model 705. As a particular example, the frame-level probabilities output by the United States English (EnUS) teacher keyword detector model 704 can be weighted using the logarithmic probability provided by the United States English (EnUS) acoustic model 705. These weighted frame-level probabilities are used as the labels for the positive data 706 when training the student keyword detector model 702.

As shown in FIG. 7, to train the student keyword detector model 702, both positive data 706 without accent information and negative data 708 are provided to the student keyword detector model 702. The negative data 708 is provided with "0" labels, and the weighted frame-level probabilities from the weighting process 707 are used as labels for the positive data 706. In various embodiments of this disclosure, a loss function 710 for training the student keyword detector model 702 is the CCE loss between the predictions of the teacher keyword detector model 704 for a particular sample ($Y\_t\_total$) weighted with the audio-level probabilities of the acoustic model 705 and the predictions for the samples from the student keyword detector model 702 ($Y\_s$). One example of this is shown in Equation (4) above. In some embodiments, the keyword detector model loss function 710 can additionally include the standard CCE loss of the ground truth ($\alpha$). One example of this is shown in Equation (5) above.

The $Y\_t\_total$ is obtained using the audio-level probability of the best sequence from each acoustic model 705 ($Y\_AM\_accent$) for a particular data sample and weighting the frame-level predictions of each output ($Y\_t\_accent$) from the teacher keyword detector models 704. All frame outputs of a particular audio from particular accented data are weighted using the same audio-level output for that audio from that particular accented acoustic model 705. The weighted frame-level probabilities from all accents are summed, and a softmax function is applied to output a probability distribution and used as labels for training the student keyword detector model 702. One example of this is shown in Equation (7) below.

$$Y\_t\_total = \text{Softmax}(Y\_AM\_enUS * Y\_t\_enUS + Y\_AM\_enGB * Y\_t\_enGB + \ldots + Y\_AM\_koKR * Y\_t\_koKR) \quad (7)$$

Here, * denotes a scalar vector multiplication, the AM probabilities are scalars, and the teacher probabilities per accent are vectors.

The training of the student keyword detector model 702 using the loss function 710 results in altering the weights of the student keyword detector model 702 based on the determined loss over a plurality of training batches and/or one or more epochs. This can occur until the loss of the student keyword detector model 702 is minimized, such as below a specified threshold. Once training is complete, the student keyword detector model 702 can be deployed onto a client electronic device as a single lightweight model and used to detect wake words or phrases in a plurality of different accents.

Although FIG. 7 illustrates one example of a training with acoustic models architecture 700, various changes may be made to FIG. 7. For example, although FIG. 7 shows providing frame-level probabilities related to five particular accents and/or languages from the plurality of teacher models 704 and from the acoustic models 705, the accents and/or languages shown in FIG. 7 are merely examples, and other or additional accent and/or language types (as well as any number of teacher models 704 and acoustic models 705) may be used. Also, in some embodiments, both the training process of the architecture 500 of FIG. 5 and the training process of the architecture 700 of FIG. 7 can be performed to train the student keyword detector model, such as by providing positive data that includes both a first subset of audio frames labeled with corresponding accent types and a second subset of audio frames not labeled with corresponding accent types. The process of FIG. 5 can be performed using the labeled positive data and the process of FIG. 7 can be performed using the unlabeled positive data to train the student model using both types of positive data.

Figure 8:
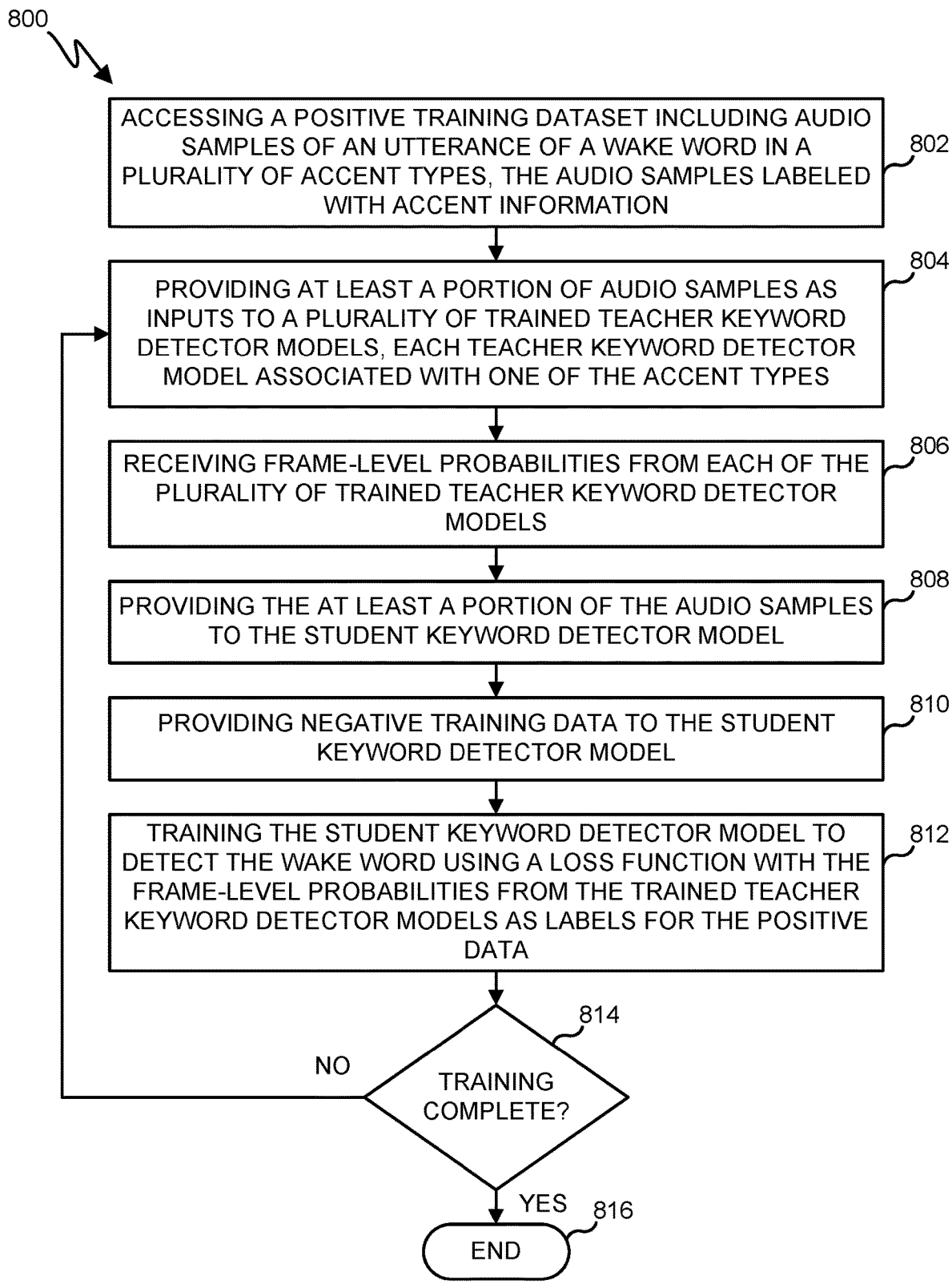
FIG. 8 illustrates an example method for training a student keyword detection model using positive training data labeled with accent information in accordance with embodiments of this disclosure.

FIG. 8 illustrates an example method 800 for training a student keyword detection model using positive training data labeled with accent information in accordance with embodiments of this disclosure. For ease of explanation, the method 800 shown in FIG. 8 is described as being performed using the server 106 of FIG. 1. For example, the method 800 can be executed on the server 106 of FIG. 1. After training, a trained student keyword detector model can be deployed to a client electronic device 101. However, the method 800 may be used with any other suitable device(s), such as the electronic device 101, and in any other suitable system.

At block 802, the processor accesses a positive training dataset including audio samples of utterances of a wake word in a plurality of accent types, and the audio samples are labeled with accent and/or language information, such as an accent type like Indian English. At block 804, the processor provides at least a portion of audio samples as inputs to a plurality of trained teacher keyword detector models, where each trained teacher keyword detector model is associated with one of the plurality of accent types. In various embodiments of this disclosure, the audio samples provided to each of the trained teacher keyword detector models are labeled according to the teacher model to which the audio sample is provided. For example, an audio sample labeled as a United States English sample is provided to a teacher model trained on United States English utterances, another audio sample labeled as a British English sample is provided to a teacher model trained on British English utterances, and so on. In some embodiments, the trained teacher keyword detector models may be trained using the loss function of Equation (1).

At block 806, the processor receives frame-level probabilities output by each of the plurality of trained teacher keyword detector models, where the frame-level probabilities indicate a likelihood that an audio frame from the positive training dataset includes a wake word or phrase. At block 808, the processor provides, to a student keyword detector model, at least the portion of the audio samples from the positive training dataset provided to the plurality of trained teacher models at block 804. At block 810, the processor also provides, to the student keyword detector model, negative training data, meaning training data samples of utterances that do not include a wake word or phrase.

At block 812, the processor trains the student keyword detector model to detect the wake word or phrase with a loss function that uses the frame-level probabilities output from the trained teacher keyword detector models as labels for the positive data. In various embodiments of this disclosure, the negative data samples may be labeled with zeroes. The loss function in some embodiments of this disclosure can be the loss function of Equation (2) or Equation (3). At decision block 814, the processor determines whether the training of the student keyword detector model is complete. For example, the training of the student keyword detector model at block 812 using the loss function results in altering the weights of the student keyword detector model based on the determined loss over a plurality of training batches and/or one or more epochs. This can occur until the loss of the student keyword detector model is minimized, such as below a specified threshold. Once below the predefined threshold, the processor can determine that training is complete. If not, the method 800 loops back to block 804 to provide additional training data to the models. Otherwise, the method 800 ends at block 816.

Although FIG. 8 illustrates one example of a method 800 for training a keyword detection model using positive training data labeled with accent information, various changes may be made to FIG. 8. For example, while shown as a series of steps, various steps in FIG. 8 could overlap, occur in parallel, occur in a different order, or occur any number of times. As a particular example, blocks 804-812 could occur any number of times depending on the number of batches or epochs used to minimize the loss of the student keyword detector model. Additionally, after the training is complete, the method 800 could include additional steps to deploy the trained student keyword detector model onto a client electronic device as a single lightweight model that is used to detect wake words or phrases in a plurality of different accents.

Figure 9A:
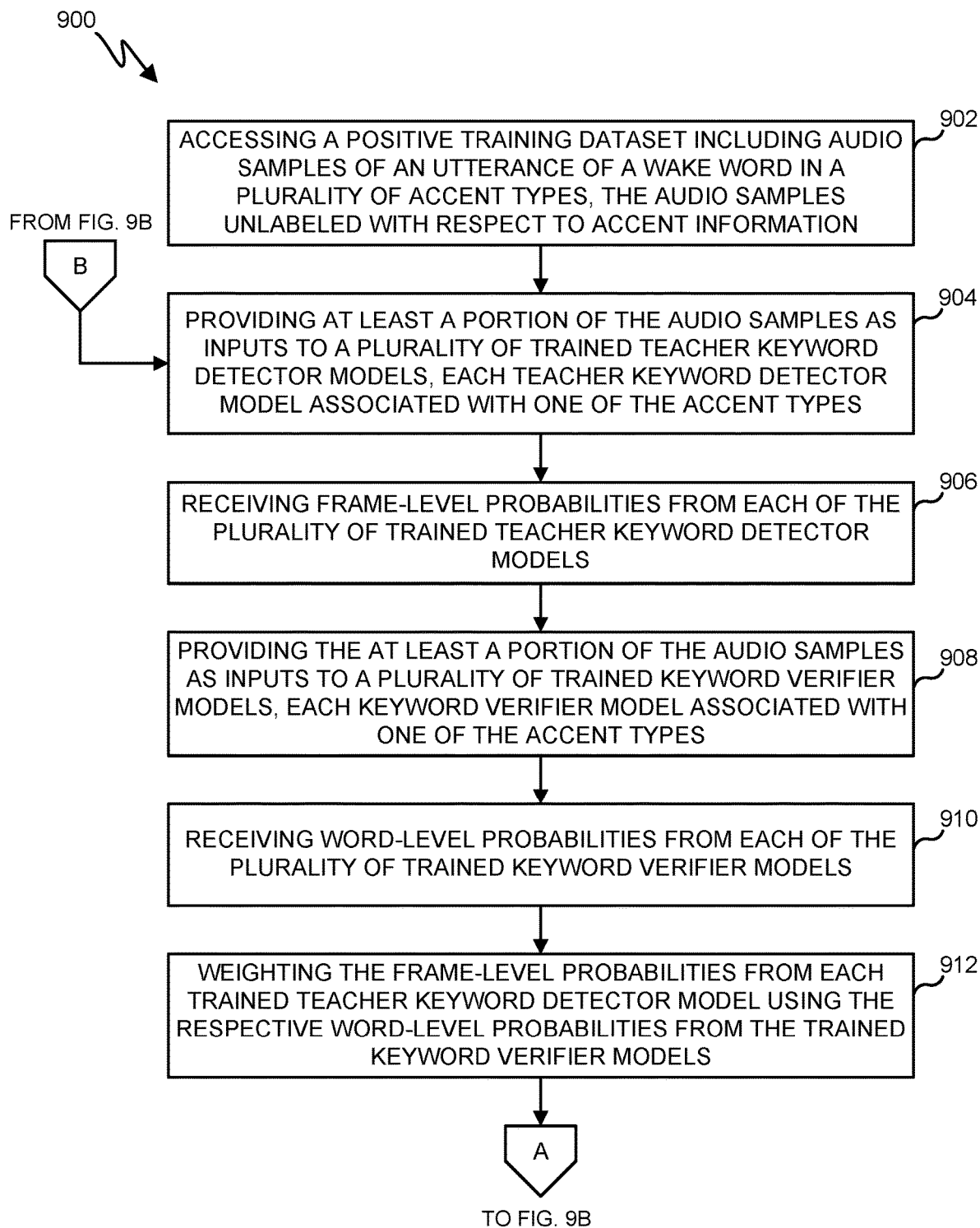
FIGS. 9A and 9B illustrate an example method for training a student keyword detection model using positive training data without accent information and using keyword verifier models in accordance with embodiments of this disclosure.
Figure 9B:
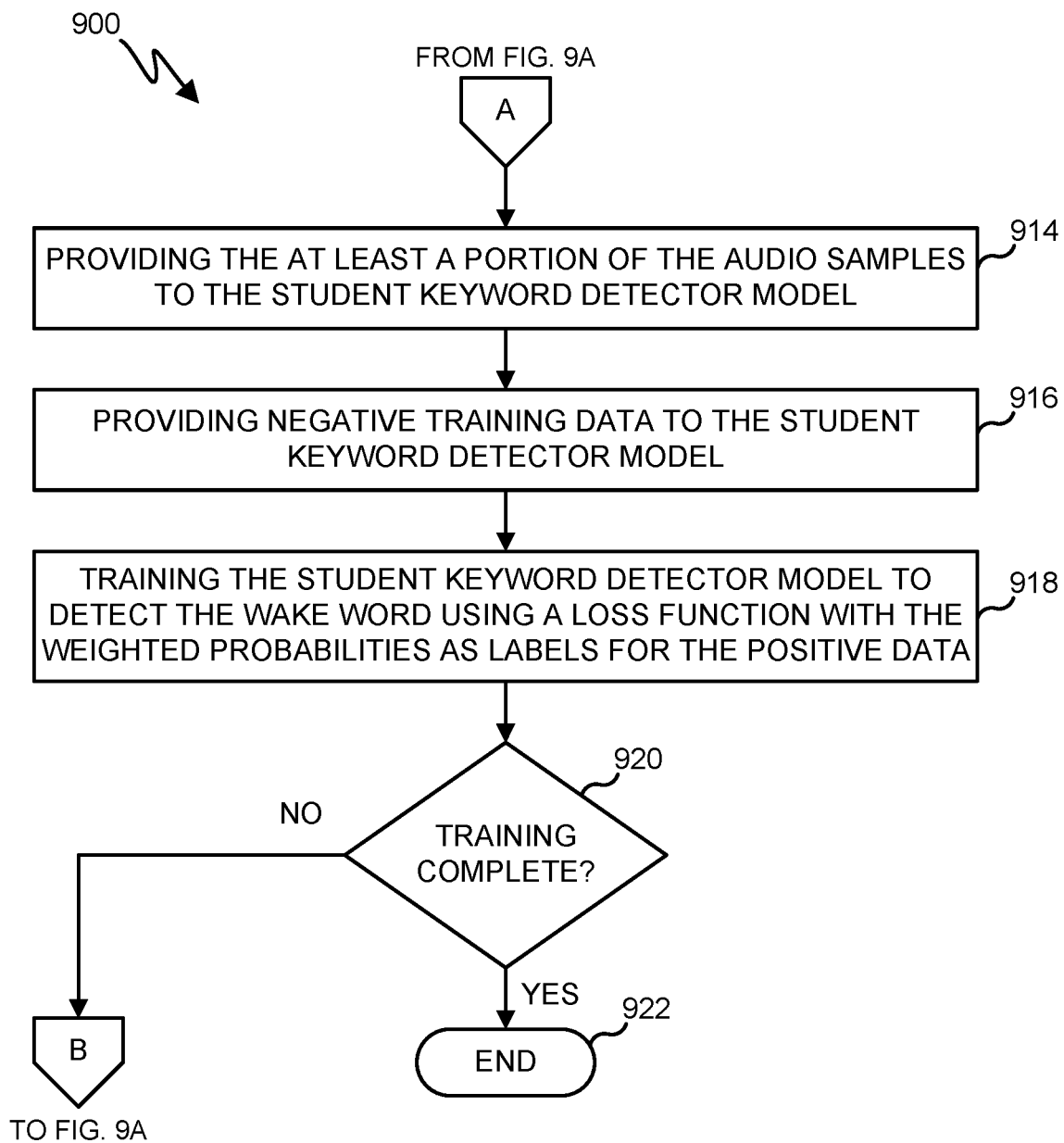

FIGS. 9A and 9B illustrate an example method 900 for training a student keyword detection model using positive training data without accent information and using keyword verifier models in accordance with embodiments of this disclosure. For ease of explanation, the method 900 shown in FIGS. 9A and 9B is described as being performed using the server 106 of FIG. 1. For example, the method 900 can be executed on the server 106 of FIG. 1. After training, a trained student keyword detector model can be deployed to a client electronic device 101. However, the method 900 may be used with any other suitable device(s), such as the electronic device 101, and in any other suitable system.

At block 902, the processor accesses a positive training dataset including audio samples of utterances of a wake word in a plurality of accent types, where the audio samples are unlabeled with respect to accent and/or language information. However, it will be understood that the audio samples could be labeled with other information besides accent and/or language information. At block 904, the processor provides at least a portion of the audio samples as inputs to a plurality of trained teacher keyword detector models, where each trained teacher keyword detector model is associated with one of the plurality of accent types. In various embodiments of this disclosure, the trained teacher keyword detector models are trained using the loss function of Equation (1). In some embodiments of this disclosure, the same audio samples are provided to each of the plurality of trained teacher keyword detector models in order to receive frame-level probabilities for each audio sample. In this way, frame-level probabilities will be generally higher for an audio sample of an accent type that matches one of the teacher models, and frame-level probabilities output by teacher models of accent types that do not match the audio sample will be generally lower.

At block 906, the processor receives frame-level probabilities output by each of the plurality of trained teacher keyword detector models, where the frame-level probabilities indicate a likelihood that an audio frame from the positive training dataset includes a wake word or phrase. At block 908, the processor provides at least the portion of the audio samples as inputs to a plurality of trained keyword verifier models, where each trained keyword verifier model is associated with one of the accent types. At block 910, the processor receives word-level probabilities from each of the plurality of trained keyword verifier models.

At block 912, the processor weights the frame-level probabilities received from each trained teacher keyword detector model at block 906 using the respective word-level probabilities from the trained keyword verifier models received at block 910. Weighting the frame-level probabilities in this way reinforces the probabilities by verifying the accuracy of the frame-level probabilities using the word-level probabilities provided by the trained keyword verifier models. At block 914, the processor provides, to a student keyword detector model, at least the portion of the audio samples from the positive training dataset provided to the plurality of trained teacher models at block 904. At block 916, the processor also provides, to the student keyword detector model, negative training data, meaning training data samples of utterances that do not include a wake word or phrase.

At block 918, the processor trains the student keyword detector model to detect the wake word or phrase with a loss function that uses the weighted frame-level probabilities created at block 912 as labels for the positive audio sample data. In various embodiments of this disclosure, the negative data samples may be labeled with zeroes. The loss function in some embodiments of this disclosure can be the loss function of Equation (4) or Equation (5). At decision block 920, the processor determines whether the training of the student keyword detector model is complete. For example, the training of the student keyword detector model at block 918 using the loss function results in altering the weights of the student keyword detector model based on the determined loss over a plurality of training batches and/or one or more epochs. This can occur until the loss of the student keyword detector model is minimized, such as below a specified threshold. Once below the predefined threshold, the processor can determine that training is complete. If not, the method 900 loops back to block 904 to provide additional training data to the models. Otherwise, the method 900 ends at block 922.

Although FIGS. 9A and 9B illustrate one example of a method 900 for training a student keyword detection model using positive training data without accent information and using keyword verifier models, various changes may be made to FIGS. 9A and 9B. For example, while shown as a series of steps, various steps in FIGS. 9A and 9B could overlap, occur in parallel, occur in a different order, or occur any number of times. As a particular example, blocks 904-918 could occur any number of times depending on the number of batches or epochs used to minimize the loss of the student keyword detector model. Additionally, after the training is complete, the method 900 could include additional steps to deploy the trained student keyword detector model onto a client electronic device as a single lightweight model that is used to detect wake words or phrases in a plurality of different accents. Further, in some embodiments, both the training method 800 of FIG. 8 and the training method 900 of FIGS. 9A and 9B can be performed to train the student keyword detector model, such as by providing positive data that includes both a first subset of audio frames labeled with corresponding accent types and a second subset of audio frames not labeled with corresponding accent types. The method 800 of FIG. 8 may be performed using labeled positive data and the method 900 of FIGS. 9A and 9B may be performed using the unlabeled positive data to train the student model using both types of positive data.

Figure 10A:
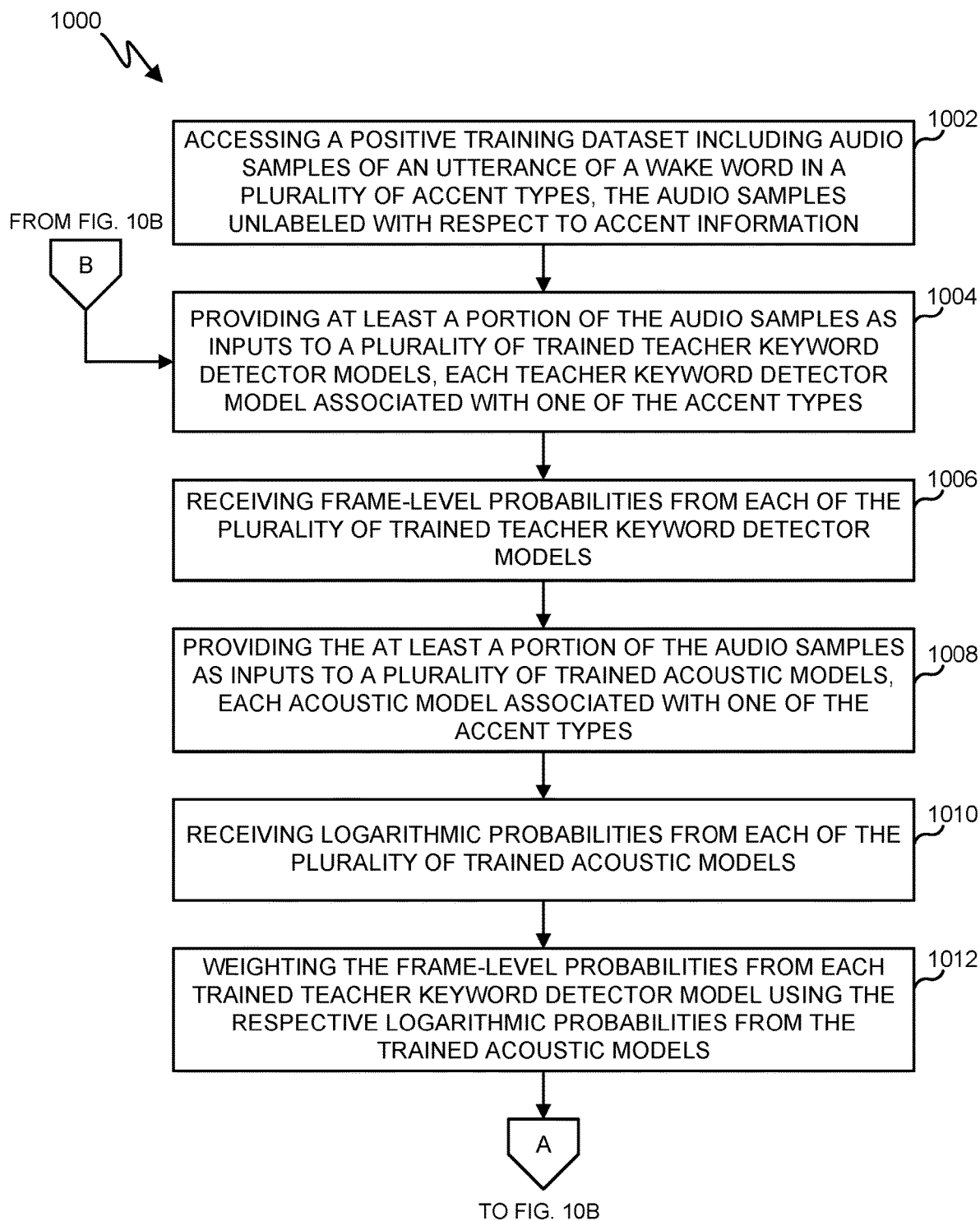
FIGS. 10A and 10B illustrate an example method for training a student keyword detection model using positive training data without accent information and using acoustic models in accordance with embodiments of this disclosure.
Figure 10B:
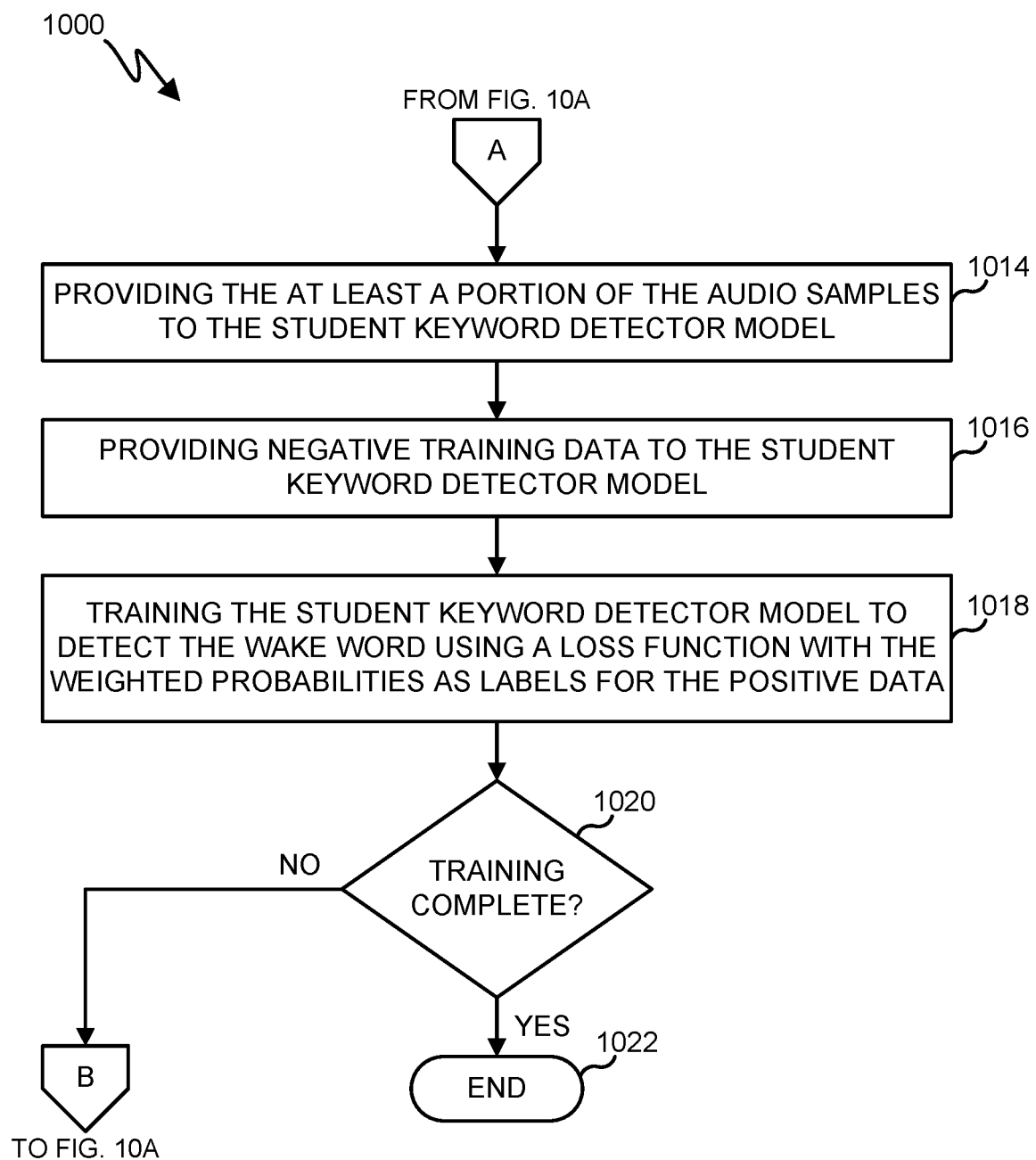

FIGS. 10A and 10B illustrate an example method 1000 for training a student keyword detection model using positive training data without accent information and using acoustic models in accordance with embodiments of this disclosure.

For ease of explanation, the method 1000 shown in FIGS. 10A and 10B is described as being performed using the server 106 of FIG. 1. For example, the method 1000 can be executed on the server 106 of FIG. 1. After training, a trained student keyword detector model can be deployed to a client electronic device 101. However, the method 1000 may be used with any other suitable device(s), such as the electronic device 101, and in any other suitable system.

At block 1002, the processor accesses a positive training dataset including audio samples of utterances of a wake word in a plurality of accent types, where the audio samples are unlabeled with respect to accent and/or language information. However, it will be understood that the audio samples could be labeled with other information besides accent and/or language information. At block 1004, the processor provides at least a portion of the audio samples as inputs to a plurality of trained teacher keyword detector models, where each trained teacher keyword detector model is associated with one of the plurality of accent types. In various embodiments of this disclosure, the trained teacher keyword detector models are trained using the loss function of Equation (1). In some embodiments of this disclosure, the same audio samples are provided to each of the plurality of trained teacher keyword detector models in order to receive frame-level probabilities for each audio sample. In this way, frame-level probabilities will be generally higher for an audio sample of an accent type that matches one of the teacher models, and frame-level probabilities output by teacher models of accent types that do not match the audio sample will be generally lower.

At block 1006, the processor receives frame-level probabilities output by each of the plurality of trained teacher keyword detector models, where the frame-level probabilities indicate a likelihood that an audio frame from the positive training dataset includes a wake word or phrase. At block 1008, the processor provides at least the portion of the audio samples as inputs to a plurality of trained acoustic models, where each trained acoustic model is associated with one of the accent types. At block 1010, the processor receives logarithmic probabilities from each of the plurality of trained acoustic models.

At block 1012, the processor weights the frame-level probabilities received from each trained teacher keyword detector model at block 1006 using the respective logarithmic probabilities from the trained acoustic models received at block 1010. Weighting the frame-level probabilities in this way reinforces the probabilities by verifying the accuracy of the frame-level probabilities using the logarithmic probabilities provided by the trained acoustic models. Using logarithmic probabilities can also increase the accuracy of the probabilities. At block 1014, the processor provides, to a student keyword detector model, at least the portion of the audio samples from the positive training dataset provided to the plurality of trained teacher models at block 1004. At block 1016, the processor also provides, to the student keyword detector model, negative training data, meaning training data samples of utterances that do not include a wake word or phrase.

At block 1018, the processor trains the student keyword detector model to detect the wake word or phrase with a loss function that uses the weighted frame-level probabilities created at block 1012 as labels for the positive audio sample data. In various embodiments of this disclosure, the negative data samples may be labeled with zeroes. The loss function in some embodiments of this disclosure can be the loss function of Equation (4) or Equation (5). At decision block 1020, the processor determines whether the training of the student keyword detector model is complete. For example, the training of the student keyword detector model at block 1018 using the loss function results in altering the weights of the student keyword detector model based on the determined loss over a plurality of training batches and/or one or more epochs. This can occur until the loss of the student keyword detector model is minimized, such as below a specified threshold. Once below the predefined threshold, the processor can determine that training is complete. If not, the method 1000 loops back to block 1004 to provide additional training data to the models. Otherwise, the method 1000 ends at block 1022.

Although FIGS. 10A and 10B illustrate one example of a method 1000 for training a student keyword detection model using positive training data without accent information and using acoustic models, various changes may be made to FIGS. 10A and 10B. For example, while shown as a series of steps, various steps in FIGS. 10A and 10B could overlap, occur in parallel, occur in a different order, or occur any number of times. As a particular example, blocks 1004-1018 could occur any number of times depending on the number of batches or epochs used to minimize the loss of the student keyword detector model. Additionally, after the training is complete, the method 1000 could include additional steps to deploy the trained student keyword detector model onto a client electronic device as a single lightweight model that is used to detect wake words or phrases in a plurality of different accents. Further, in some embodiments, both the training method 800 of FIG. 8 and the training method 1000 of FIGS. 10A and 10B can be performed to train the student keyword detector model, such as by providing positive data that includes both a first subset of audio frames labeled with corresponding accent types and a second subset of audio frames not labeled with corresponding accent types. The method 800 of FIG. 8 may be performed using labeled positive data and the method 1000 of FIGS. 10A and 10B may be performed using the unlabeled positive data to train the student model using both types of positive data.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
accessing, using at least one processor of an electronic device, a machine learning model, wherein the machine learning model is a trained student model that is trained using audio samples in a plurality of accent types, and wherein the trained student model is trained to detect a wake word using information distilled from a plurality of trained teacher keyword detector models, each trained teacher keyword detector model associated with a different accent type of the plurality of accent types;
receiving, using the at least one processor, an audio input from an audio input device;
providing, using the at least one processor, the audio input to the trained student model;
calculating, using the trained student model, frame-level probabilities associated with the audio input;
receiving, using the at least one processor, an output from the trained student model including the frame-level probabilities associated with the audio input; and
instructing, using the at least one processor, at least one action based on the frame-level probabilities associated with the audio input.

2. The method of claim 1, wherein the audio input comprises the wake word.

3. The method of claim 2, wherein the frame-level probabilities associated with the audio input represent at least one probability that the audio input includes the wake word.

4. The method of claim 1, wherein the audio samples in the plurality of accent types are part of a positive training dataset and each include an utterance of the wake word in one of the plurality of accent types.

5. The method of claim 1, wherein the information distilled from the plurality of trained teacher keyword detector models includes frame-level probabilities that are output from the plurality of trained teacher keyword detector models and used as labels for at least a portion of the audio samples.

6. The method of claim 5, wherein the information distilled from the plurality of trained teacher keyword detector models includes frame-level probabilities that are output from the plurality of trained teacher keyword detector models and that are modified using one or more word-level probabilities provided by one or more other trained models.

7. An apparatus comprising:
at least one processing device configured to:
access a machine learning model, wherein the machine learning model is a trained student model that is trained using audio samples in a plurality of accent types, and wherein the trained student model is trained to detect a wake word using information distilled from a plurality of trained teacher keyword detector models, each trained teacher keyword detector model associated with a different accent type of the plurality of accent types;
receive an audio input from an audio input device;
provide the audio input to the trained student model;
calculate, using the trained student model, frame-level probabilities associated with the audio input;
receive an output from the trained student model including the frame-level probabilities associated with the audio input; and
instruct at least one action based on the frame-level probabilities associated with the audio input.

8. The apparatus of claim 7, wherein the audio input comprises the wake word.

9. The apparatus of claim 8, wherein the frame-level probabilities associated with the audio input represent at least one probability that the audio input includes the wake word.

10. The apparatus of claim 7, wherein the audio samples in the plurality of accent types are part of a positive training dataset and each include an utterance of the wake word in one of the plurality of accent types.

11. The apparatus of claim 7, wherein the information distilled from the plurality of trained teacher keyword detector models includes frame-level probabilities that are output from the plurality of trained teacher keyword detector models and used as labels for at least a portion of the audio samples.

12. The apparatus of claim 11, wherein the information distilled from the plurality of trained teacher keyword detector models includes frame-level probabilities that are output from the plurality of trained teacher keyword detector models and that are modified using one or more word-level probabilities provided by one or more other trained models.

13. A non-transitory computer readable medium containing instructions that when executed cause at least one processor to:
access a machine learning model, wherein the machine learning model is a trained student model that is trained using audio samples in a plurality of accent types, and wherein the trained student model is trained to detect a wake word using information distilled from a plurality of trained teacher keyword detector models, each trained teacher keyword detector model associated with a different accent type of the plurality of accent types;
receive an audio input from an audio input device;
provide the audio input to the trained student model;
calculate, using the trained student model, frame-level probabilities associated with the audio input;
receive an output from the trained student model including the frame-level probabilities associated with the audio input; and
instruct at least one action based on the frame-level probabilities associated with the audio input.

14. The non-transitory computer readable medium of claim 13, wherein the audio input comprises the wake word.

15. The non-transitory computer readable medium of claim 14, wherein the frame-level probabilities associated with the audio input represent at least one probability that the audio input includes the wake word.

16. The non-transitory computer readable medium of claim 13, wherein the audio samples in the plurality of accent types are part of a positive training dataset and each include an utterance of the wake word in one of the plurality of accent types.

17. The non-transitory computer readable medium of claim 13, wherein the information distilled from the plurality of trained teacher keyword detector models includes frame-level probabilities that are output from the plurality of trained teacher keyword detector models and used as labels for at least a portion of the audio samples.

18. The non-transitory computer readable medium of claim 17, wherein the information distilled from the plurality of trained teacher keyword detector models includes frame-level probabilities that are output from the plurality of trained teacher keyword detector models and that are modified using one or more word-level probabilities provided by one or more other trained models.

19. A method comprising:
training, using at least one processor of an electronic device, a machine learning model, wherein the machine learning model is a student keyword detector model, using information distilled from a plurality of trained teacher keyword detector models,
wherein training the student keyword detector model comprises:
accessing a positive training dataset including audio samples that include an utterance of a wake word in a plurality of accent types;
providing at least a portion of the audio samples in the positive training dataset as inputs to the plurality of trained teacher keyword detector models, wherein each of the plurality of trained teacher keyword detector models is associated with one of the plurality of accent types;
calculating, using the trained teacher keyword detector models, frame-level probabilities associated with one or more frames in each of the audio samples;
receiving, from the plurality of trained teacher keyword detector models, the frame-level probabilities associated with one or more frames in each of the audio samples; and
training the student keyword detector model to detect the wake word using the frame-level probabilities received from each of the plurality of trained teacher keyword detector models.

20. The method of claim 19, wherein one or more of the audio samples in at least the portion of the audio samples in the positive training dataset are each labeled with one of the plurality of accent types.

21. The method of claim 19, wherein one or more of the audio samples in at least the portion of the audio samples in the positive training dataset are each unlabeled with respect to the plurality of accept types.

22. The method of claim 21, wherein training the student keyword detector model further comprises:
providing the one or more of the audio samples that are unlabeled with respect to the plurality of accept types as inputs to a plurality of trained word verifier models, wherein each of the plurality of trained word verifier models is associated with one of the plurality of accent types;
receiving, from the plurality of trained word verifier models, word-level probabilities associated with one or more words in the one or more of the audio samples that are unlabeled with respect to the plurality of accept types; and
modifying the frame-level probabilities received from the plurality of trained teacher keyword detector models based on the word-level probabilities received from the plurality of trained word verifier models, the student keyword detector model trained to detect the wake word using the modified frame-level probabilities as labels for the positive training dataset.

23. The method of claim 22, wherein the word-level probabilities are logarithmic probabilities received from a plurality of trained acoustic models obtained using a connectionist temporal classification loss function.

24. The method of claim 19, wherein training the student keyword detector model causes the student keyword detector model to predict a frame-level probability for each frame in an audio input regardless of an accent in which the audio input is spoken.

* * * * *